3,028,380
Patented Apr. 3, 1962

3,028,380

6α-METHYLPREGNANE DERIVATIVES AND PROCESS FOR PREPARING SAME

Vladimir Petrow and David Morton Williamson, London, England, assignors to The British Drug Houses Limited, London, England, a British company No Drawing. Filed June 30, 1959, Ser. No. 823,820
Claims priority, application Great Britain July 9, 1958
6 Claims. (Cl. 260—239.5)

This invention is for improvements in or relating to organic compounds and has particular reference to the preparation of new 6:16-dimethylpregnane derivatives which are of value as intermediates in the preparation of 17α-hydroxy- and 17α-acyloxy-6:16-dimethyl derivatives of pregnane which are valuable as progestational agents.

In particular 17α-acetoxy-6α,16-dimethylprogesterone is found to be 100 times more potent than dimethisterone (6α,21 - dimethylethisterone; 6α,21 - dimethylanhydrohydroxy-progesterone) in the Clauberg assay. As dimethisterone (6α,21-dimethylethisterone) is known to be slightly more than 10 times as active as anhydrohydroxyprogesterone (ethisterone) in the Clauberg assay (David, Hartley, Millson and Petrow, J. Pharm. Pharmacol., 1957, 9, 929), it will be apparent to those skilled in the art that 17α-acetoxy-6α,16-dimethylprogesterone is a progestational agent of quite unexpected and remarkable potency, and its preparation a matter of importance.

It is an object of the present invention to provide the new compound 6α:16 - dimethylpregna-4:16-dien-3:20-dione (I)

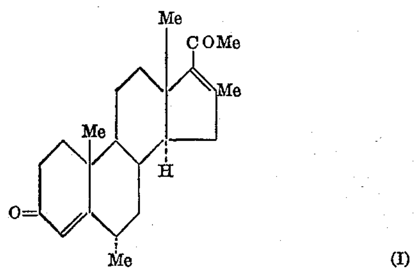

The above compound is a valuable and convenient starting material for the preparation of the potent progestational agent 17α-acetoxy-6α,16-dimethylprogesterone. The conversion into this progestational agent may be accomplished by converting the 3-oxo-derivative, 6α:16-dimethylpregna-4:16-dien-3:20-dione (I) into the 16α,17α-epoxide, converting this 16α,17α-epoxide into a 17α-hydroxy-16β-halo-16α-methyl intermediate by reaction with a halohydrin, reductively removing the halogen atom and acetylating the tert.-hydroxyl group at $C_{17}$.

The present invention also provides the intermediate pyrazoline 6α-methyl-16:17-(2′:3′-diazacyclopent-2′-eno)-pregn-4-ene-3:20-dione (II)

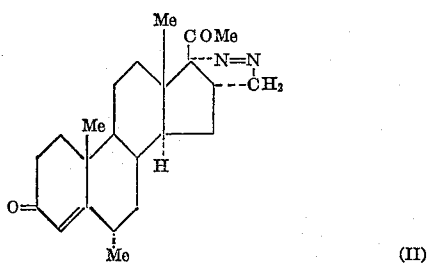

According to the present invention there is provided a process for the preparation of 6α:16-dimethylpregna-4:16-dien-3:20-dione which process comprises reacting 6α-methylpregna-4:16-diene-3:20-dione

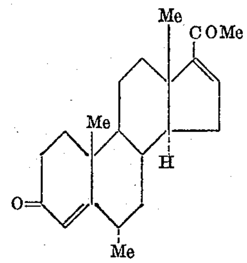

with diazomethane to yield the corresponding 16α,17α-methylene diazo derivative (II) or pyrazoline and thermally decomposing the pyrazoline.

Addition of diazomethane to the starting material (III) is preferably performed in an unreactive organic solvent such as diethyl ether and the reaction mixture allowed to stand at room temperature for periods of 16 to 40 hours, and the pyrazoline subsequently isolated by removal of the solvent by evaporation and crystallisation of the residue.

Decomposition of the pyrazoline (II) to yield the 6:16-dimethylpregnane derivative (I) may readily be performed by heating the pyrazoline under reflux in an inert organic solvent of B.P. approximately the same as the M.P. of the pyrazoline, such as dibutyl ether, for 3 to 5 hours. p-Cymene and ethylene glycol are other solvents suitable for effecting this thermal decomposition.

Following is a description by way of example of a method of carrying the invention into effect.

EXAMPLE 1

*6α-Methyl-16:17-(2′:3′-Diazacyclopent-2′-eno)pregn-4-ene-3:20-Dione (II)*

6α-methylpregna-4:16-diene-3:20-dione (III) (1 g.) dissolved in methanol (10 ml.) was treated with diazomethane (1 g.) in ether (30 ml.) overnight at room temperature. Excess diazomethane was destroyed by addition of dilute acetic acid and the ether extracts were washed with water, sodium bicarbonate solution, water and dried. After removal of the ether the residue was crystallised from methanol yielding 6α-methyl-16:17-(2′:3′-diazacyclopent-2′-eno)pregn-4-ene-3:20-dione (II), prisms, M.P. 153 to 154° C., $[\alpha]_D^{24}$ +112° (c., 0.364 in chloroform), $$\lambda_{max.}^{EtOH}\ 238\text{ to }239\ m\mu,\ \epsilon\ 16{,}707$$

*6α:16-Dimethylpregna-4:16-Diene-3:20-Dione (I)*

The foregoing pyrazoline (II) (500 mg.) was heated under reflux in dibutyl ether (20 ml.) for 2 hours. The dibutyl ether was removed under reduced pressure and the residue was crystallised from methanol to give 6α:16-dimethylpregna-4:16-diene-3:20-dione (I), M.P. 188 to 190° C., $[\alpha]_D^{24}$ +65° (c., 0.338 in $CHCl_3$), $$\lambda_{max.}^{EtOH}\ 242\text{ to }244,\ \epsilon=23{,}322$$

We claim:

1. A process for the preparation of 6α:16-dimethylpregna-4:16-dien-3:20-dione which process comprises reacting 6α-methylpregna-4:16-diene-3:20-dione with diazomethane to yield the corresponding 16α,17α-methylene diazo derivative and heating to thermally decompose the said 16α,17α-methylene diazo derivative.

2. A process as claimed in claim 1 wherein the diazomethane in diethyl ether is added to the steroid starting material and the reaction mixture allowed to stand at room temperature for periods of 16 to 40 hours.

3. A process as claimed in claim 1 wherein the 16α,17α-methylene diazo derivative is decomposed by heating under reflux in an inert organic solvent of B.P. approximately the same as the M.P. of the 16α,17α-methylene diazo derivative.

4. A process as claimed in claim 3 wherein the inert organic solvent is dibutyl ether and the heating under reflux is carried out for 3 to 5 hours.

5. 6α:16-dimethylpregna-4:16-dien-3:20-dione.

6. 6α-methyl-16:17-(2':3'-diazacyclopent-2'-eno-pregn-4-ene-3:20-dione.

References Cited in the file of this patent

UNITED STATES PATENTS

| | | |
|---|---|---|
| 2,880,213 | Loken et al. | Mar. 31, 1959 |
| 2,888,457 | Beyler et al. | May 26, 1959 |